United States Patent
Zorgui et al.

(10) Patent No.: US 12,273,813 B2
(45) Date of Patent: Apr. 8, 2025

(54) USER EQUIPMENT (UE) POWER SAVING

(71) Applicant: QUALCOMM Incorporated, San Diego, CA (US)

(72) Inventors: Marwen Zorgui, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/889,254

(22) Filed: Aug. 16, 2022

(65) Prior Publication Data

US 2024/0064632 A1 Feb. 22, 2024

(51) Int. Cl.
*H04W 52/02* (2009.01)
*H04W 76/27* (2018.01)
*H04W 76/28* (2018.01)

(52) U.S. Cl.
CPC ... *H04W 52/0216* (2013.01); *H04W 52/0219* (2013.01); *H04W 76/27* (2018.02); *H04W 76/28* (2018.02)

(58) Field of Classification Search
CPC ......... H04W 52/0216; H04W 52/0219; H04W 76/27; H04W 76/28
See application file for complete search history.

(56) References Cited

U.S. PATENT DOCUMENTS

| 2011/0199984 A1 | 8/2011 | Umesh et al. |
| 2020/0059991 A1 | 2/2020 | Wu |

FOREIGN PATENT DOCUMENTS

EP 4030865 A1 7/2022

OTHER PUBLICATIONS

3GPP TR 38.864, V0.5.0, (Nov. 2022), "3rd Generation Partnership Project; Technical Specification Group Radio Access Network; Study on network energy savings for NR (Release 18)" (Year: 2022).*
International Search Report and Written Opinion—PCT/US2023/028374—ISA/EPO—Jan. 9, 2024.
Partial International Search Report—PCT/US2023/028374—ISA/EPO—Nov. 15, 2023.

* cited by examiner

*Primary Examiner* — James P Duffy
(74) *Attorney, Agent, or Firm* — Kevin M. Donnelly; Seyfarth Shaw LLP

(57) ABSTRACT

A method for wireless communication by a user equipment includes receiving, from a network node, a first message configuring a group of inactivity timers including indicating a respective timer duration value for each inactivity timer of the group of inactivity timers. Each inactivity timer of the group of inactivity timers may be associated with a respective network power saving mode of a group of network power saving modes. The method also includes initiating a first inactivity timer of the group of inactivity timers with a respective timer duration value based on receiving a first downlink transmission from the network node or transmitting first uplink information to the network node. The method further includes enabling a radio resource control (RRC) state of a group of RRC states based on an expiration of the first inactivity timer.

29 Claims, 10 Drawing Sheets

700 ⟶

702 — RECEIVE, FROM A NETWORK NODE, A FIRST MESSAGE CONFIGURING A GROUP OF INACTIVITY TIMERS INCLUDING INDICATING A RESPECTIVE TIMER DURATION VALUE FOR EACH INACTIVITY TIMER OF THE GROUP OF INACTIVITY TIMERS, EACH INACTIVITY TIMER OF THE GROUP OF INACTIVITY TIMERS ASSOCIATED WITH A RESPECTIVE NETWORK POWER SAVING MODE OF A GROUP OF NETWORK POWER SAVING MODES

704 — INITIATE A FIRST INACTIVITY TIMER OF THE GROUP OF INACTIVITY TIMERS WITH THE RESPECTIVE TIMER DURATION VALUE BASED ON RECEIVING A FIRST DOWNLINK TRANSMISSION FROM THE NETWORK NODE OR TRANSMITTING FIRST UPLINK INFORMATION TO THE NETWORK NODE

706 — ENABLE A RADIO RESOURCE CONTROL (RRC) STATE OF A GROUP OF RRC STATES BASED ON AN EXPIRATION OF THE FIRST INACTIVITY TIMER

*FIG. 7*

USER EQUIPMENT (UE) POWER SAVING

FIELD OF THE DISCLOSURE

The present disclosure relates generally to wireless communications, and more specifically to configuring one or more power saving functions at a user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communication network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A network node, such as a base station, may be powered by an external power source to provide continuous access to the wireless communication network. In some examples, power consumption of the network node may account for a majority of a total power consumption associated with the wireless communication network. In some such examples, to reduce the total power consumed by the wireless communication network, the network node may enter a network power saving mode based on an amount of network traffic being less than a threshold. In contrast to the network node, the UE may use a battery as a power source. Therefore, the UE may operate for a limited amount of time without an external power source. In some examples, the UE may enter an idle state or an inactive state to improve battery life.

SUMMARY

In one aspect of the present disclosure, a method for wireless communication at a user equipment (UE) includes receiving, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. The method further includes initiating a first inactivity timer of the group of inactivity timers with the respective timer duration value based on receiving a first downlink transmission from the network node or transmitting first uplink information to the network node. The method still further includes enabling a radio resource control (RRC) state of a group of RRC states based on an expiration of the first inactivity timer.

Another aspect of the present disclosure is directed to an apparatus including means for receiving, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. The apparatus further includes means for initiating a first inactivity timer of the group of inactivity timers with the respective timer duration value based on receiving a first downlink transmission from the network node or transmitting first uplink information to the network node. The apparatus still further includes means for enabling an RRC state of a group of RRC states based on an expiration of the first inactivity timer.

In another aspect of the present disclosure, a non-transitory computer-readable medium with non-transitory program code recorded thereon is disclosed. The program code is executed by a processor and includes program code to receive, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. The program code further includes program code initiate a first inactivity timer of the group of inactivity timers with the respective timer duration value based on receiving a first downlink transmission from the network node or transmitting first uplink information to the network node. The program code still further includes program code to enable an RRC state of a group of RRC states based on an expiration of the first inactivity timer.

Another aspect of the present disclosure is directed to an apparatus having a processor, and a memory coupled with the processor and storing instructions operable, when executed by the processor, to cause the apparatus to receive, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. Execution of the instructions also cause the apparatus to initiate a first inactivity timer of the group of inactivity timers with the respective timer duration value based on receiving a first downlink transmission from the network node or transmitting first uplink information to the network node. Execution of the instructions further cause the apparatus to enable an RRC state of a group of RRC states based on an expiration of the first inactivity timer.

In one aspect of the present disclosure, a method for wireless communication at a UE includes receiving, from a network node, a first message indicating, for each network power saving mode of a group of network power saving modes, one or more respective switching parameters for each RRC state of a group of RRC states. The method further includes receiving, from the network node, a second message indicating a current network power saving mode, of the group of network power saving modes, enabled at the network node. The method still further includes switching from a current RRC state, of the group of RRC states, to a new RRC state, of the group of RRC states, based on the one or more respective parameters conditions, of the current network power saving mode, associated with the current RRC state.

Another aspect of the present disclosure is directed to an apparatus including means for receiving, from a network node, a first message indicating, for each network power saving mode of a group of network power saving modes, one or more respective switching parameters for each RRC state of a group of RRC states. The apparatus further includes means for receiving, from the network node, a second message indicating a current network power saving mode, of the group of network power saving modes, enabled at the network node. The apparatus still further includes means for switching from a current RRC state, of the group of RRC states, to a new RRC state, of the group of RRC states, based on the one or more respective parameters conditions, of the current network power saving mode, associated with the current RRC state.

In another aspect of the present disclosure, a non-transitory computer-readable medium with non-transitory program code recorded thereon is disclosed. The program code is executed by a processor and includes program code to receive, from a network node, a first message indicating, for each network power saving mode of a group of network power saving modes, one or more respective switching parameters for each RRC state of a group of RRC states. The program code further includes program code to receive, from the network node, a second message indicating a current network power saving mode, of the group of network power saving modes, enabled at the network node. The program code still further includes program code to switch from a current RRC state, of the group of RRC states, to a new RRC state, of the group of RRC states, based on the one or more respective parameters conditions, of the current network power saving mode, associated with the current RRC state.

Another aspect of the present disclosure is directed to an apparatus having a processor, and a memory coupled with the processor and storing instructions operable, when executed by the processor, to cause the apparatus to receive, from a network node, a first message indicating, for each network power saving mode of a group of network power saving modes, one or more respective switching parameters for each RRC state of a group of RRC states. Execution of the instructions further cause the apparatus to receive, from the network node, a second message indicating a current network power saving mode, of the group of network power saving modes, enabled at the network node. Execution of the instructions also cause the apparatus to switch from a current RRC state, of the group of RRC states, to a new RRC state, of the group of RRC states, based on the one or more respective parameters conditions, of the current network power saving mode, associated with the current RRC state.

In one aspect of the present disclosure, a method for wireless communication at a UE includes receiving, from a network node, a first message configuring an inactivity timer including indicating a timer duration value for the inactivity timer and one of a group of timer restart values for the inactivity timer or a restart duration value for the inactivity timer. The method further includes initiating the inactivity timer based on receiving a downlink transmission from the network node or transmitting uplink information to the network node. The method still further includes restarting the inactivity timer based on receiving, from the network node, a second message indicating a current network power saving mode, of a group of network power saving modes, enabled at the network node.

Another aspect of the present disclosure is directed to an apparatus including means for receiving, from a network node, a first message configuring an inactivity timer including indicating a timer duration value for the inactivity timer and one of a group of timer restart values for the inactivity timer or a restart duration value for the inactivity timer. The apparatus further includes means for initiating the inactivity timer based on receiving a downlink transmission from the network node or transmitting uplink information to the network node. The apparatus still further includes means for restarting the inactivity timer based on receiving, from the network node, a second message indicating a current network power saving mode, of a group of network power saving modes, enabled at the network node.

In another aspect of the present disclosure, a non-transitory computer-readable medium with non-transitory program code recorded thereon is disclosed. The program code is executed by a processor and includes program code to receive, from a network node, a first message configuring an inactivity timer including indicating a timer duration value for the inactivity timer and one of a group of timer restart values for the inactivity timer or a restart duration value for the inactivity timer. The program code further includes program code to initiate the inactivity timer based on receiving a downlink transmission from the network node or transmitting uplink information to the network node. The program code still further includes program code to restart the inactivity timer based on receiving, from the network node, a second message indicating a current network power saving mode, of a group of network power saving modes, enabled at the network node.

Another aspect of the present disclosure is directed to an apparatus having a processor, and a memory coupled with the processor and storing instructions operable, when executed by the processor, to cause the apparatus to receive, from a network node, a first message configuring an inactivity timer including indicating a timer duration value for the inactivity timer and one of a group of timer restart values for the inactivity timer or a restart duration value for the inactivity timer. Execution of the instructions further cause the apparatus to initiate the inactivity timer based on receiving a downlink transmission from the network node or transmitting uplink information to the network node. Execution of the instructions also cause the apparatus to restart the inactivity timer based on receiving, from the network node, a second message indicating a current network power saving mode, of a group of network power saving modes, enabled at the network node.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 7 is a flow diagram illustrating an example process performed by the UE, in accordance with various aspects of the present disclosure.

DETAILED DESCRIPTION

Figure 1:
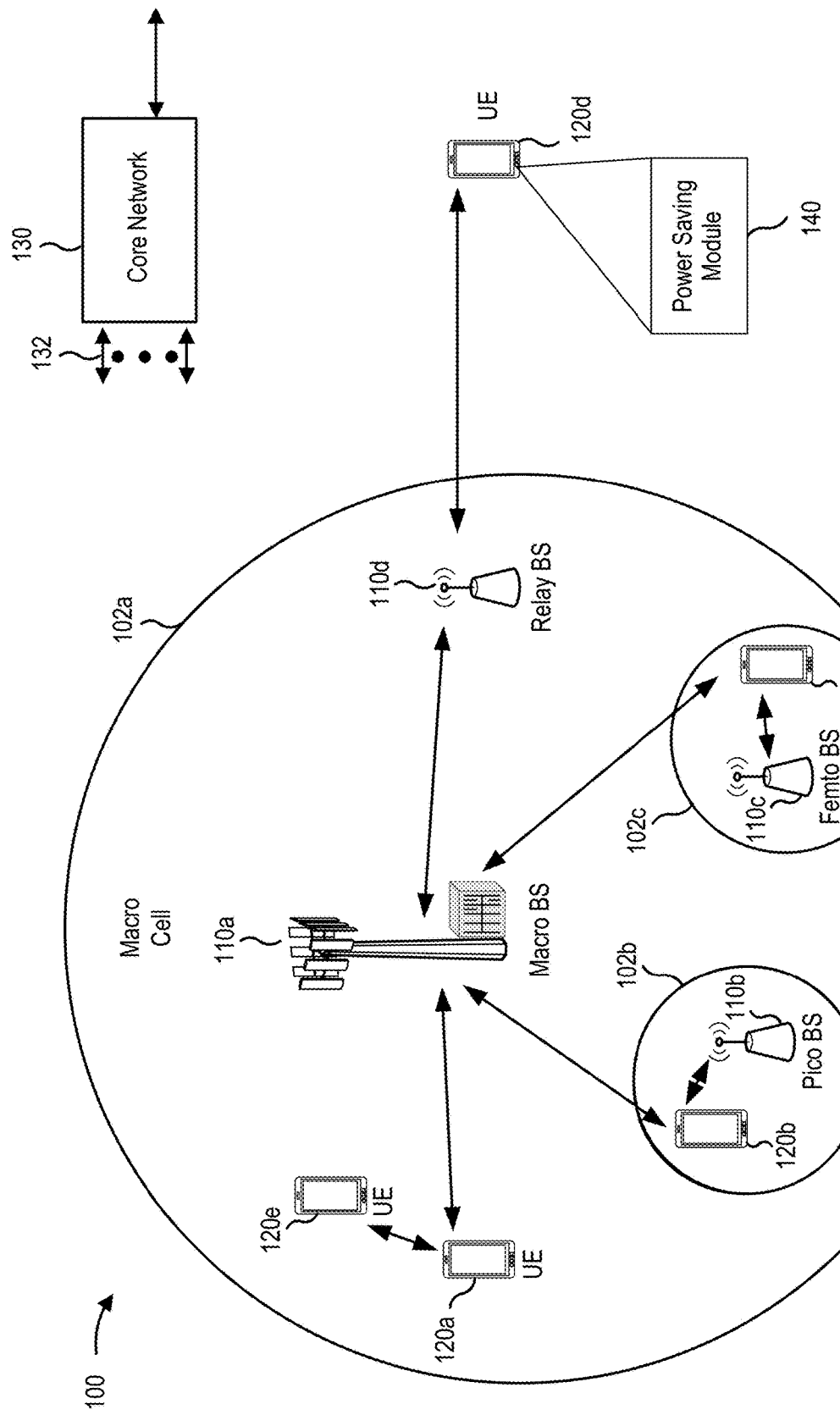
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G wireless technologies, aspects of the present disclosure can be applied in other generation-based communications systems, such as and including 6G and later wireless technologies.

To reduce the total power consumed by a wireless communication network, a network node may enter a network power saving mode selected from a group of network power saving modes (for example, including a light sleep mode and a deep sleep mode) based on an amount of network traffic being less than one or more thresholds. Each of the network power saving modes may be associated with a respective transition time and a respective power consumption level. In contrast to the network node, a user equipment (UE) may use a battery as a power source. In some examples, the UE may be configured with a data inactivity timer that may be initiated, or restarted, based on the UE transmitting or receiving a transmission via a data channel or a control channel. The UE may transition from a resource control (RRC) connected state to an RRC idle state or an RRC inactive state upon expiration of the data inactivity timer. Power consumption may be reduced while the UE is in the RRC idle state or the RRC inactive state. In conventional systems, the UE does not define different data inactivity timers for each of the network power saving modes associated with the network node. Therefore, in conventional systems, a duration of the data inactivity timer remains the same for each of the network power saving modes associated with the network node. Additionally, in conventional systems, a data inactivity timer is not associated with a respective restart value for each network power saving mode of the group of network power saving modes associated with the network node. Finally, in conventional systems, the UE does not configure a respective RRC state transition for each network power saving mode of the group of network power saving modes associated with the network node.

Various aspects of the present disclosure are directed to power saving, at a UE, by configuring a power saving function at a UE. In some examples, the power saving function may be associated with a group of inactivity timers configured at the UE. Each inactivity timer of the group of inactivity timers may be associated with a respective network power saving mode of a group of network power saving modes. For example, a network node may transmit, to the UE, a message configuring the group of inactivity timers at the UE including indicating a respective timer duration value for each inactivity timer of the group of inactivity timers. Each of the timer duration values sets a respective duration for the respective inactivity timer. In some examples, the message may further include one or more timer restart values for the group of inactivity timers or one or more restart duration values for the group of inactivity timers. Each timer restart value corresponds to an initial value the inactivity timer is set to after restarting the inactivity timer. Each restart duration value corresponds to a duration associated with the inactivity timer after restarting the inactivity timer, which may be different than the initial duration of the inactivity timer.

In some examples, the UE is associated with the group of inactivity timers to enable faster transitions between RRC states for certain network power saving modes. In such examples, each inactivity timer of the group of inactivity timers may be associated with a same default restart value. In some such examples, the default restart value is zero. Additionally, in some such examples, the respective timer duration value of each inactivity timer may not change after the restart.

In examples in which the network node configures the UE with the group of inactivity timers, the UE may initiate (for example, start) one selected inactivity timer of the group of inactivity timers, which may subsequently count up from a start value, based on receiving a downlink transmission from the network node or transmitting uplink information to the network node. The initiated inactivity timer may be selected based on the inactivity timer being associated with the current network power saving mode enabled by the network node. After initiating the inactivity timer, the UE may enable an RRC state, such as an RRC idle state or an RRC inactive state, based on expiration of the inactivity timer as a result of not receiving a downlink transmission or transmitting uplink information within the duration of the inactivity timer. In some examples, based on receiving a second downlink transmission from the network node or transmitting second uplink information to the network node, the UE may restart the inactivity timer at the default restart value with a default restart duration value and transition back to an RRC connected state.

In some other examples, the power saving function may be associated with a single inactivity timer configured at the UE. The single inactivity timer may be configured by default and may be used with all network power saving modes. For example, a network node may transmit, to the UE, a message indicating an initial timer duration value for the inactivity timer and one of a group of timer restart values for the inactivity timer or a restart duration value for the inactivity timer. Each timer restart value corresponds to an initial value the inactivity timer is set to after restarting the inactivity timer. The restart duration value corresponds to a duration associated with the inactivity timer after restarting the inactivity timer, which may be different than the initial duration value of the inactivity timer. In such examples, the UE may initiate (for example, start) the single inactivity timer, which may subsequently count up from a start value, based on receiving a downlink transmission from the network node or transmitting uplink information to the network node. After initiating the single inactivity timer, the UE may enable the RRC state, such as the RRC idle state or the RRC inactive state, based on expiration of the inactivity timer as a result of not receiving a downlink transmission or transmitting uplink information within the duration of the single inactivity timer.

In some examples, the network node may transmit a message indicating the current network power saving mode, of the set of network power saving modes, enabled by the network node. The message may implicitly indicate that the network node switched from a prior network power saving mode to the current network power saving mode. In such examples, based on identifying that the network node has enabled the current network power saving mode, the UE may restart the inactivity timer at the default restart value or with the default restart duration value.

In some examples in which the UE is associated with the single inactivity timer, the single inactivity timer may be associated with the group of timer restart values, included in the message received from the network node, and a default restart duration value. Each timer restart value of the group of timer restart values may be associated with a respective network power saving mode of the group of network power saving modes. Each timer restart value, of the group of timer restart values, sets a respective restart value of the inactivity timer to a non-zero value, based on the respective network power saving mode. Setting the respective restart value to the non-zero value reduces a duration of the inactivity timer, after the restart, to enable faster transitions between RRC states In such examples, the UE may restart the single inactivity with the default restart duration value and at the respective timer restart value associated with the current network power saving mode based on the network node transmitting the message indicating the current network power saving mode, of the set of network power saving modes, is enabled by the network node.

In some other examples in which the UE is associated with the single inactivity timer, the single inactivity timer may be associated with the restart duration value, included in the message received from the network node, and the default restart value. The restart duration value may be a combination of the initial timer duration value and an offset. The network node may set the offset to a positive value or a negative value, such that the offset may, respectively, decrease or increase the restart duration value. Decreasing the restart duration value may enable faster transitions between RRC states. In such examples, the UE may restart the inactivity at the default restart value and with the restart duration value based on the network node transmitting the message indicating the current network power saving mode, of the set of network power saving modes, is enabled by the network node.

In some other examples, for each network power saving mode of a group of network power saving modes, the UE may implement a power saving function associated with one or more respective switching parameters for each of an RRC connected state, an RRC inactive state, and an RRC idle state. The switching parameters may indicate one or more conditions for switching from a current RRC state to another RRC state. In some examples, the network node may transmit, to the UE, a first message indicating, for each network power saving mode of a group of network power saving modes, the one or more respective switching parameters for each of the RRC states. In some such examples, the network node may transmit, to the UE, a second message, indicating a current network power saving mode, of the group of network power saving modes, enabled at the network node. After identifying the current network power saving mode based on the second message, the UE may switch (for example, transition) from a current RRC state to a new RRC state based on the one or more respective switching parameters associated with the current network power saving mode and the current RRC state. For example, the one or more respective switching parameters associated with the current RRC state and the current network power saving mode may configure the UE to switch from the current RRC state to an RRC idle state, without requiring expiration of an inactivity timer, when the second message indicates that the network node has enabled the current network power saving mode. As another example, one or more respective switching parameters associated with a second network power saving mode and an RRC connected state may configure the UE to transition from the RRC connected state to an RRC inactive state upon expiration of an inactivity timer based on the second message indicating that the network node has enabled the current network power saving mode.

Particular aspects of the subject matter described in this disclosure may be implemented to realize one or more of the following potential advantages. In some examples, by configuring a respective timer duration value for a group of inactivity timers, a group of timer restart values for a single inactivity timer, or a restart duration value for the single inactivity timer, techniques disclosed herein may reduce a duration of an inactivity timer so as to reduce a transition time to the RRC idle state or the RRC inactive state. In some other examples, by configuring, for each network power saving mode of a group of network power saving modes, one or more switching parameters for each of an RRC connected state, an RRC inactive state, and an RRC idle state techniques disclosed herein may reduce the transition time from a current RRC state to the RRC idle state or the RRC inactive state. Reducing the transition time to the RRC idle state or the RRC inactive state may reduce power consumption at the UE, thereby improving battery life.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a power saving module 140. For brevity, only one UE 120d is shown as including the power saving module 140. The power saving module 140 may perform one or more steps described with reference to the process 700, 800, and 900 described with reference to FIGS. 7,8, and 9, respectively.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
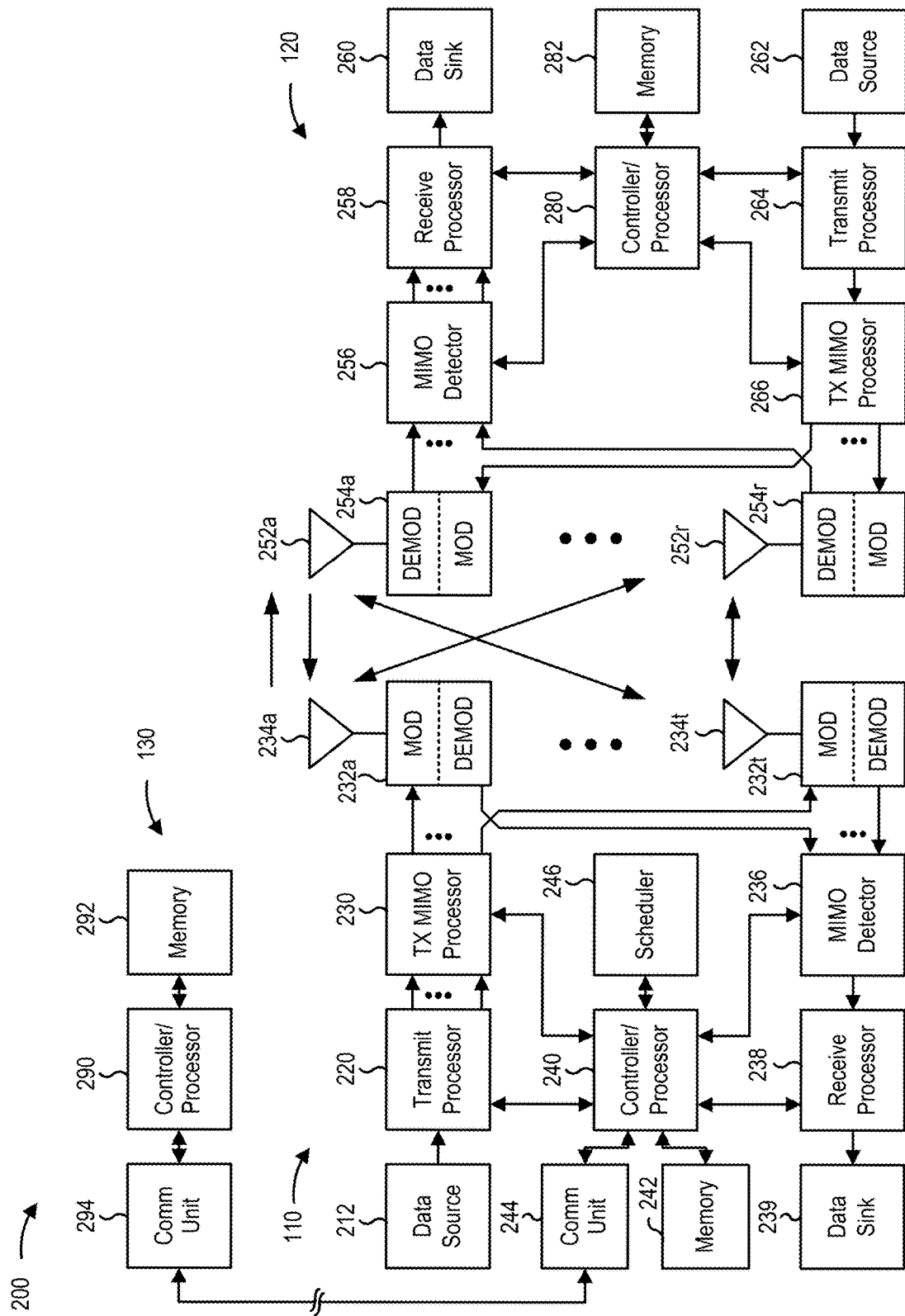
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with configuring one or more power saving functions as described in more detail elsewhere. For example, the controller/processor 240 of the base station 110, the controller/processor 280 of the UE 120, and/or any other component(s) of FIG. 2 may perform or direct operations of, for example, the processes of FIGS. 7, 8, and 9 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
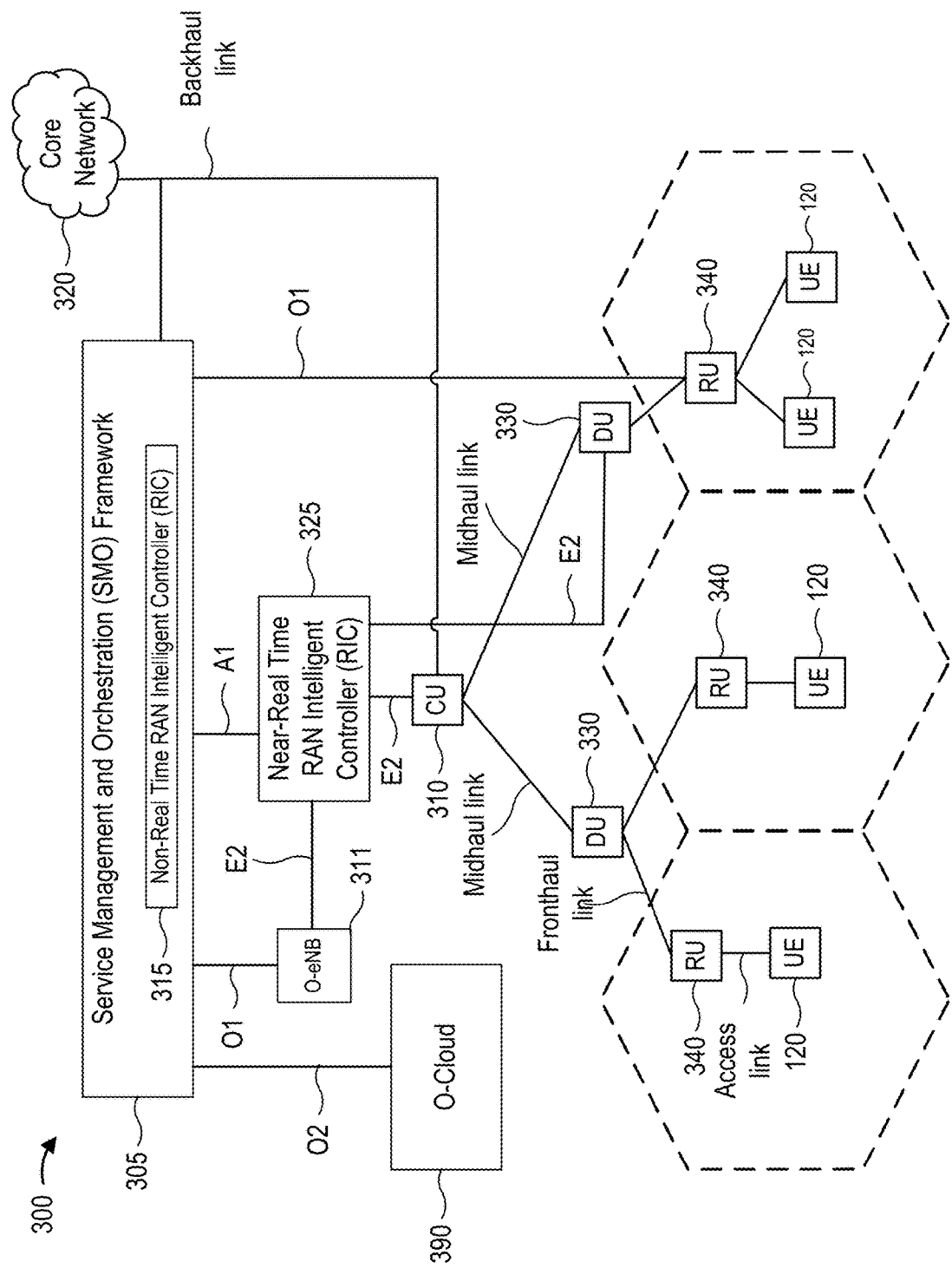
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

In some examples, power consumption of a network node may account for a majority of a total power consumption associated with a wireless communication network. In some such examples, to reduce the total power consumed by the wireless communication network, the network node may enter a network power saving mode of a group of network power saving modes (for example, a light sleep mode or a deep sleep mode) based on an amount of network traffic being less than a threshold. Each network of the network power saving modes may be associated with a transition time and a power consumption level. For example, a first network power saving mode may turn off an RF chain and a second network power saving mode does not turn off the RF chain. In this example, the network node may consume less power during the first power saving mode in comparison to an amount of power consumed, by the network node, during the second network power saving mode.

Figure 4:
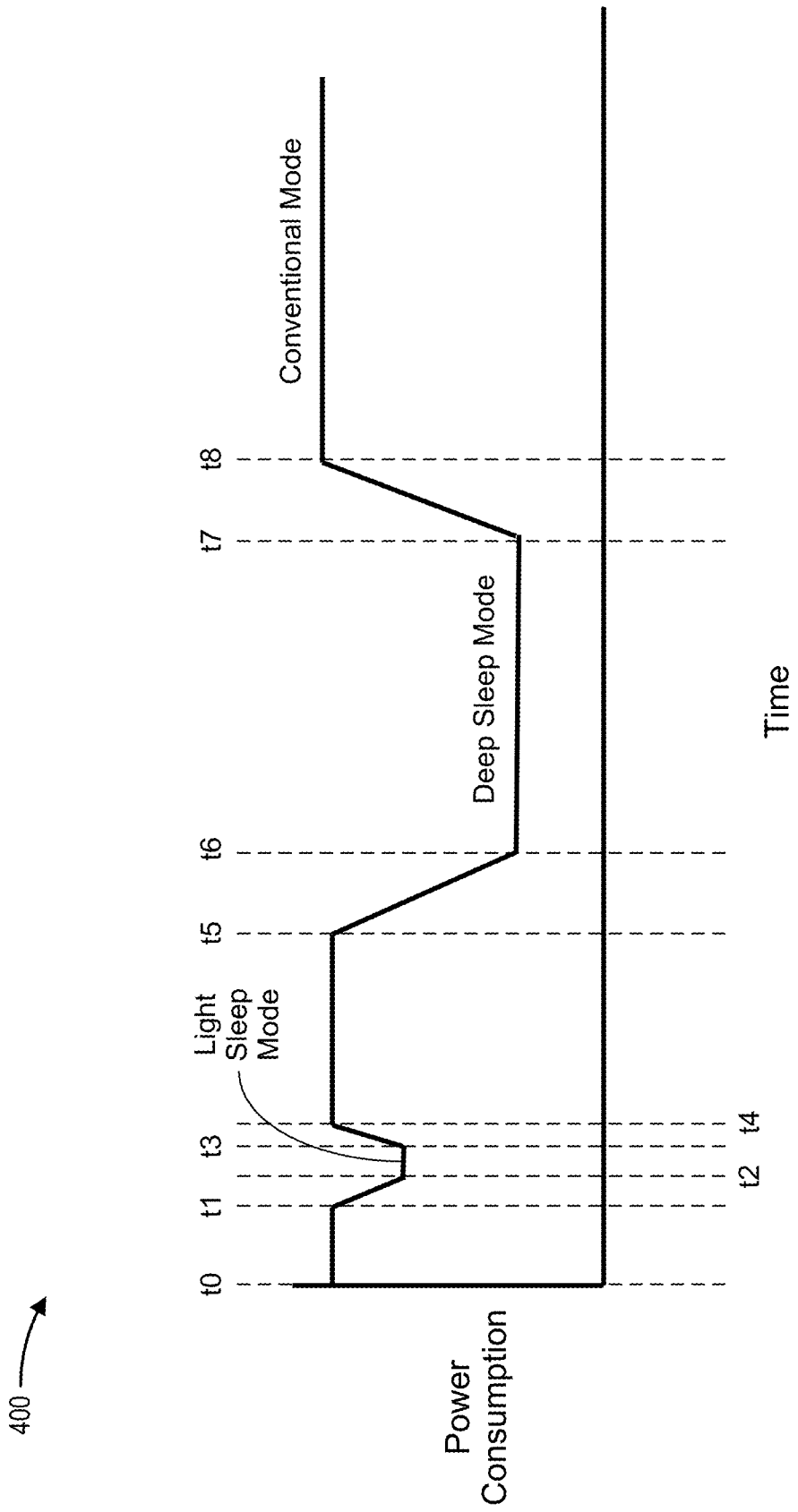
FIG. 4 is a diagram illustrating an example of a network node transitioning to different network power saving modes, in accordance with various aspects of the present disclosure.

FIG. 4 is a diagram illustrating an example 400 of a network node transitioning to different network power saving modes, in accordance with various aspects of the present disclosure. In the example 400 of FIG. 4, the y-axis represents power consumption and the x-axis represents time. As shown in the example 400 of FIG. 4, at time t0, the network node operates in a conventional mode. For ease of explanation, in the example 400 of FIG. 4, the conventional mode is associated with a high power consumption level. At time t1, the network node transitions from the conventional mode to a light sleep mode. At time t2, the network node enters the light sleep mode. For ease of explanation, in the example 400 of FIG. 4, the light sleep mode is associated with a medium power consumption level. A duration associated with a transition from one mode to another, such as the duration between times t1 and t2, may be an example of a transition period (for example, transition time). At time t3, the network node initiates a transition to the conventional mode, and at time t4, the network node operates in the conventional mode. At time t5, the network node initiates a transition to the deep sleep mode, and at time t6, the network node operates in the deep sleep mode. For ease of explanation, in the example 400 of FIG. 4, the deep sleep mode is associated with a low power consumption level. At time t7, the network node initiates a transition from the deep sleep mode, and at time t8, the network node operates in the conventional mode.

In contrast to the network node, a UE may use a battery as a power source. Therefore, the UE may operate for a limited amount of time without an external power source. In some examples, the UE may be configured with a data inactivity timer. The UE may initiate or restart the data inactivity timer based on the UE transmitting or receiving a transmission via a data channel or a control channel. The UE may transition from an RRC connected state, to an RRC idle state or an RRC inactive state upon expiration of the data inactivity timer. The UE may reduce power consumption while in the RRC idle state or the RRC inactive state.

As discussed, the network node may enter a power saving mode based on traffic conditions satisfying a power saving condition. In some examples, traffic conditions may satisfy the power saving condition when an amount of traffic is less than a traffic threshold. In some such examples, because the amount of traffic is less than a traffic threshold, power consumption at the UE may be reduced by expediting a transition to a low power state, such as an RRC idle state or an RRC inactive state. In some aspects, each power saving mode of the network node may be associated with a different inactivity timer value or a different inactivity timer initial start value. In some aspects, the UE may prematurely expire the data inactivity timer if the UE does not have data to transmit. In other aspects, the UE may enter the low power state (for example, the RRC idle state or the RRC inactive state) based on determining the network node entered a power saving mode and also based on an amount of predicted data traffic.

Figure 5A:
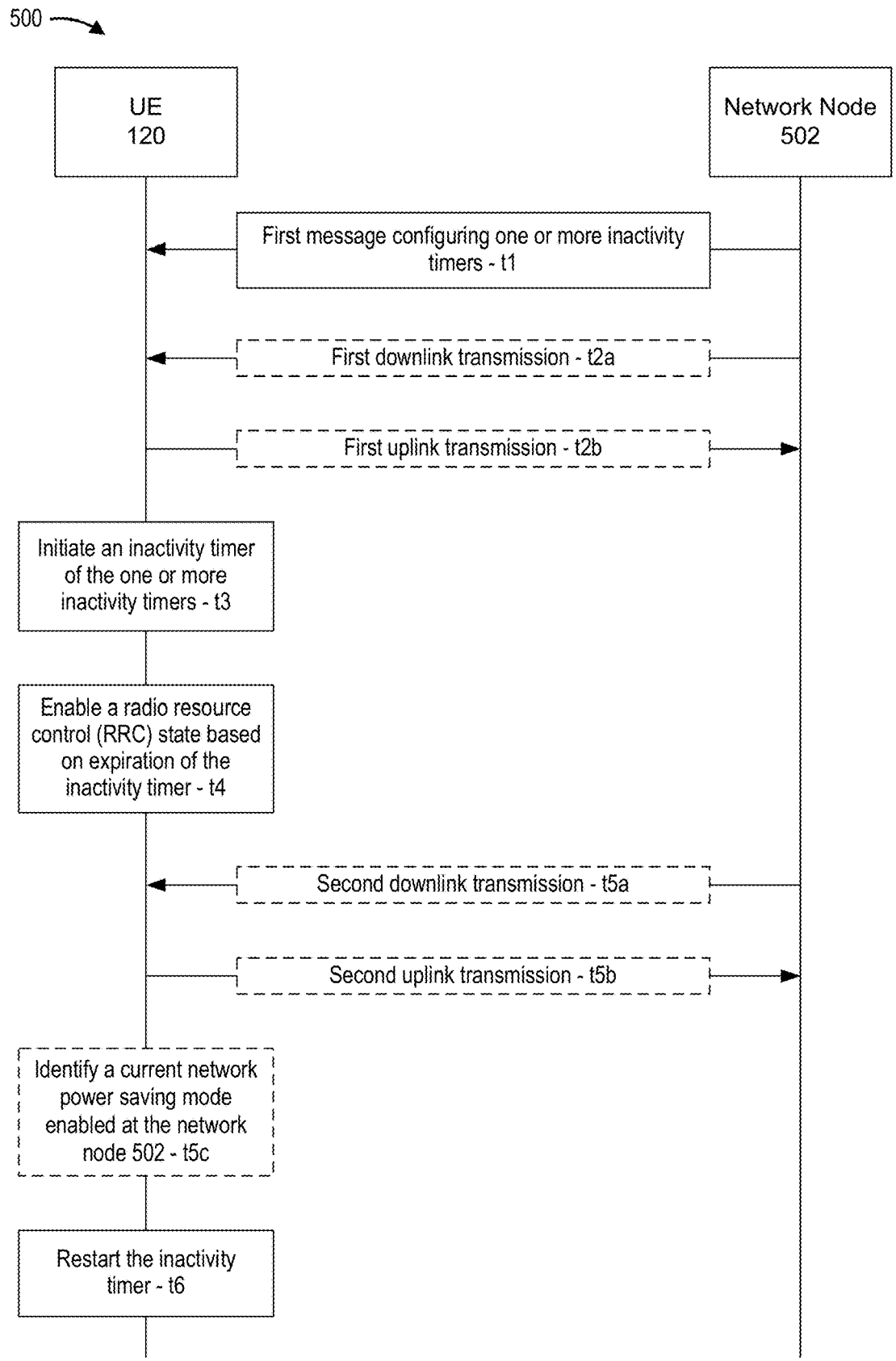
FIG. 5A is a timing diagram illustrating an example of configuring a power saving function of the UE, in accordance with various aspects of the present disclosure.

FIG. 5A is a timing diagram illustrating an example 500 of configuring one or more power saving functions of a UE 120, in accordance with various aspects of the present disclosure. In the example 500, the UE 120 may communicate with a network node 502. The network node 502 may be an example of a base station 110 as described with reference to FIGS. 1 and 2, or a CU 310, DU 330, or RU 340 as described with reference to FIG. 3. The power saving function may be associated with the timer duration value, the timer restart value, or the restart duration value. As shown in FIG. 5A, at time t1, the UE 120 may receive a first message configuring one or more inactivity timers (for example, dataInactivityTimer) at the UE.

In some examples, the UE 120 is configured with a group of inactivity timers and the first message indicates a respective timer duration value for each inactivity timer of the group of inactivity timers. Each of the timer duration values sets a respective duration for the respective inactivity timer. Each inactivity timer of the group of inactivity timers may be associated with a respective network power saving mode of a group of network power saving modes. In some examples, the first message may be an RRC message. In some other examples, each of the timer duration values updates a previously configured timer duration value for each of the group of inactivity timers. In such examples, the first message may be an RRC message, a medium access control (MAC) control element (CE) (MAC-CE), or downlink control information (DCI).

In other examples, the UE 120 is configured with a single inactivity timer and the first message indicates a timer duration value for the inactivity timer and one of a group of timer restart values for the inactivity timer or a restart duration value for the inactivity timer. Each of timer restart value of the group of timer restart values is associated with a respective power saving mode of the group of network power saving modes. Each timer restart value corresponds to an initial value the inactivity timer is set to after restarting the inactivity timer. In some examples, each timer restart value may be a non-zero value. Each restart duration value corresponds to a duration the inactivity timer is set to after restarting the inactivity timer, which may be different than the initial duration of the inactivity timer. In some examples, after receiving the first message, the UE 120 may receive another message, from the network node 502, updating the restart duration value associated with the single inactivity timer.

As shown in the example 500, at time t3, the UE 120 may initiate an inactivity timer of the one or more inactivity timers based on receiving a first downlink transmission (time t2a) from the network node 502 or transmitting first uplink information (time t2b) to the network node 502. In some examples in which the UE 120 is configured with the group of inactivity timers, the inactivity timer may be associated with the respective timer duration value associated with a current network power saving mode. In such examples, the UE 120 may pause each of the one or more inactivity timers, that is not associated with the current network power saving mode, based on initiating the inactivity timer. The network node 502 may indicate the enabled power saving mode to the UE 120. In other examples in which the UE 120 is configured with the single inactivity timer, the UE 120 initiates the single inactivity timer. After initiating the inactivity timer, at time t4, the UE 120 may enable an RRC state, such as an RRC idle state or an RRC inactive state, based on expiration of the inactivity timer.

At time t6, the UE 120 may restart the inactivity timer based on receiving a second downlink transmission (time t5a) from the network node 502 or transmitting second uplink information (time t5b) to the network node 502. Alternatively, in some examples, the UE 120 may restart the inactivity timer based on identifying a current network power saving mode enabled at the network node 502. In such examples, the UE 120 may receive a message from the network node 502 indicating the current network power saving mode enabled at the network node 502. In some examples in which the UE 120 is configured with the single inactivity timer, the UE 120 may restart the single inactivity timer to a respective timer restart value, of the group of timer restart values, based on identifying a current network power saving mode enabled at the network node 502. In such examples, the respective timer restart value may be associated with the current network power saving mode enabled at the network node 502. Each of the timer restart values may be associated with a respective network power saving mode. Additionally, each of the timer restart values is a non-zero value, such that a length of the restart duration is reduced. In other examples in which the UE 120 is configured with the single inactivity timer, the UE 120 may restart the single inactivity timer to a default restart value (for example, zero) and a duration of the inactivity timer may be based on the restart duration value, included in the message received at time t1, based identifying the current network power saving mode enabled at the network node 502. The restart duration value may be a combination of a default timer duration value and an offset value. The offset value may be a negative value or a positive value. The negative value may reduce a duration of restart duration value. In still other examples in which the UE 120 is configured with the single inactivity timer, the UE 120 restarts the inactivity timer to zero based on receiving the second downlink transmission (time t5*a*) or transmitting the second uplink transmission (time t5*b*). In such examples, the single inactivity timer restarted at a default restart value with the initial timer duration value.

Figure 5B:
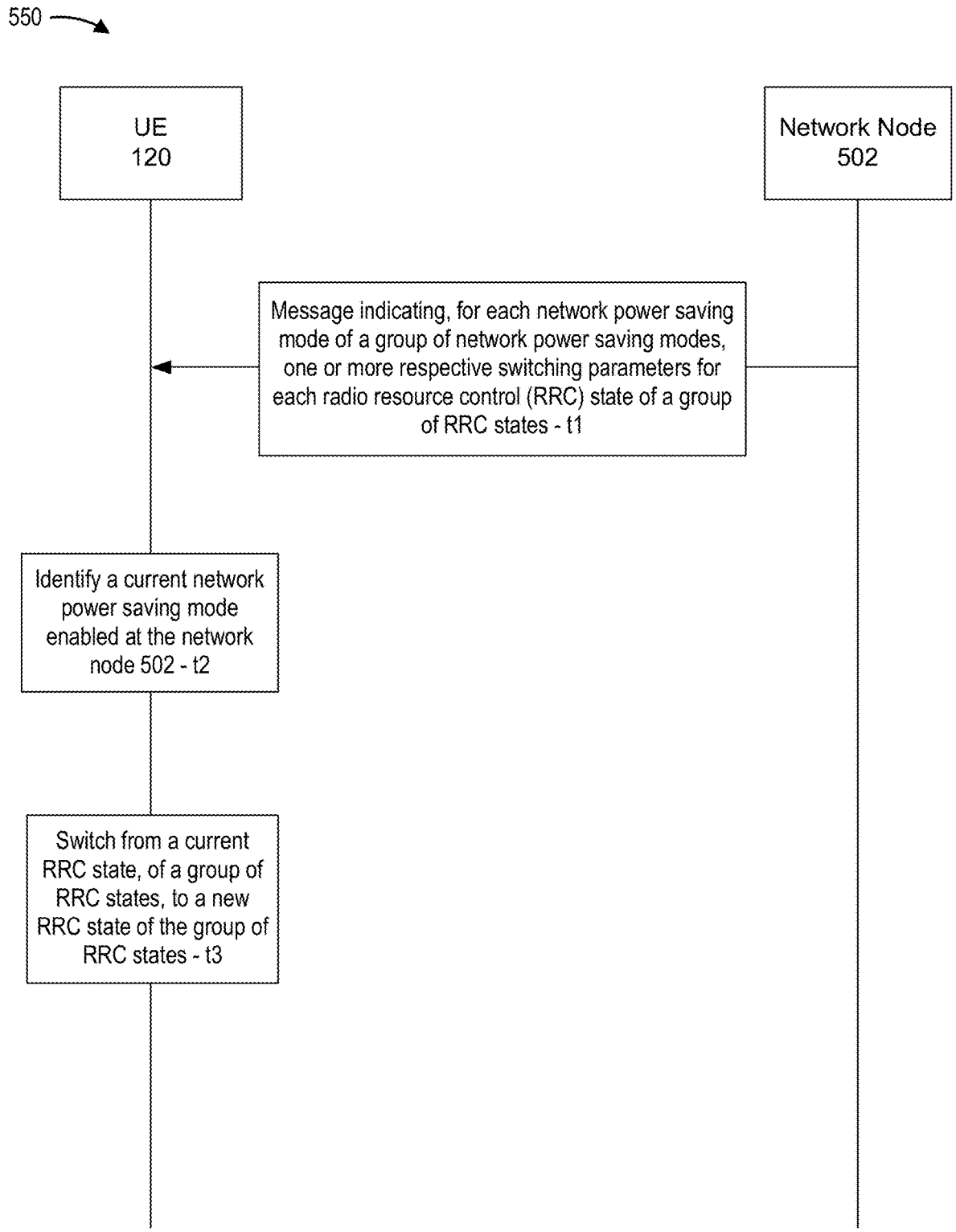
FIG. 5B is a timing diagram illustrating an example of configuring a power saving function of the UE, in accordance with various aspects of the present disclosure.

FIG. 5B is a timing diagram illustrating an example 550 of configuring a power saving function of a UE 120, in accordance with various aspects of the present disclosure. In the example 550, the UE 120 may communicate with the network node 502. The power saving function may be associated with the RRC state transition. As shown in FIG. 5B, at time t1, the UE 120 may receive, from the network node 502, a message indicating, for each network power saving mode of a group of network power saving modes, one or more respective switching parameters for each RRC state of a group of RRC states. Each RRC state transition of the group of RRC state transitions may indicate a transition to an RRC state of the group of RRC states and whether the transition requires expiration of an inactivity timer. For example, an RRC state transition may indicate, for one or more network power saving modes, that the UE 120 should transition from a current RRC state to an RRC idle state without requiring expiration of the inactivity timer. As another example, another RRC state transition from the group of RRC state transitions may indicate, for one or more of the network power saving modes, that the UE 120 should transition from an RRC inactive state to an RRC idle state without requiring expiration of the inactivity timer. In some examples, the transition may be based on a previous network power saving mode, a current network power saving mode, and the current RRC state (for example, RRC connected or RRC idle). For example, if the network node 502 transitions from a first network power saving mode to a second network power saving mode, that is different than the first network power saving mode, the UE 120 may transition from an RRC connected state to the RRC inactive state upon expiration of the inactivity timer. As another example, if the network node 502 transitions from a third network power saving mode to the second network power saving mode, the UE 120 may transition from an RRC connected state to the RRC idle state upon expiration of the inactivity timer.

As shown in FIG. 5B, at time t2, the UE 120 may identify a current network power saving mode, of the group of network power saving modes, enabled at the network node 502. The UE 120 may identify the current network power saving mode based on an indication transmitted by the network node 502. The indication may inform the UE 120 that the network node 502 enabled a specific network power saving mode, such as, for example, a light sleep mode, a deep sleep mode, a standby mode, or an off mode. At time t3, after identifying the current network power saving mode, the UE 120 may switch (for example, transition) from a current RRC state, of a group of RRC states, to a new RRC state, of the group of RRC states. The UE 120 may switch from the current RRC state to the new RRC state based on the transition configured by an RRC state transition of the group of RRC state transitions associated with the current network power saving mode.

Figure 6:
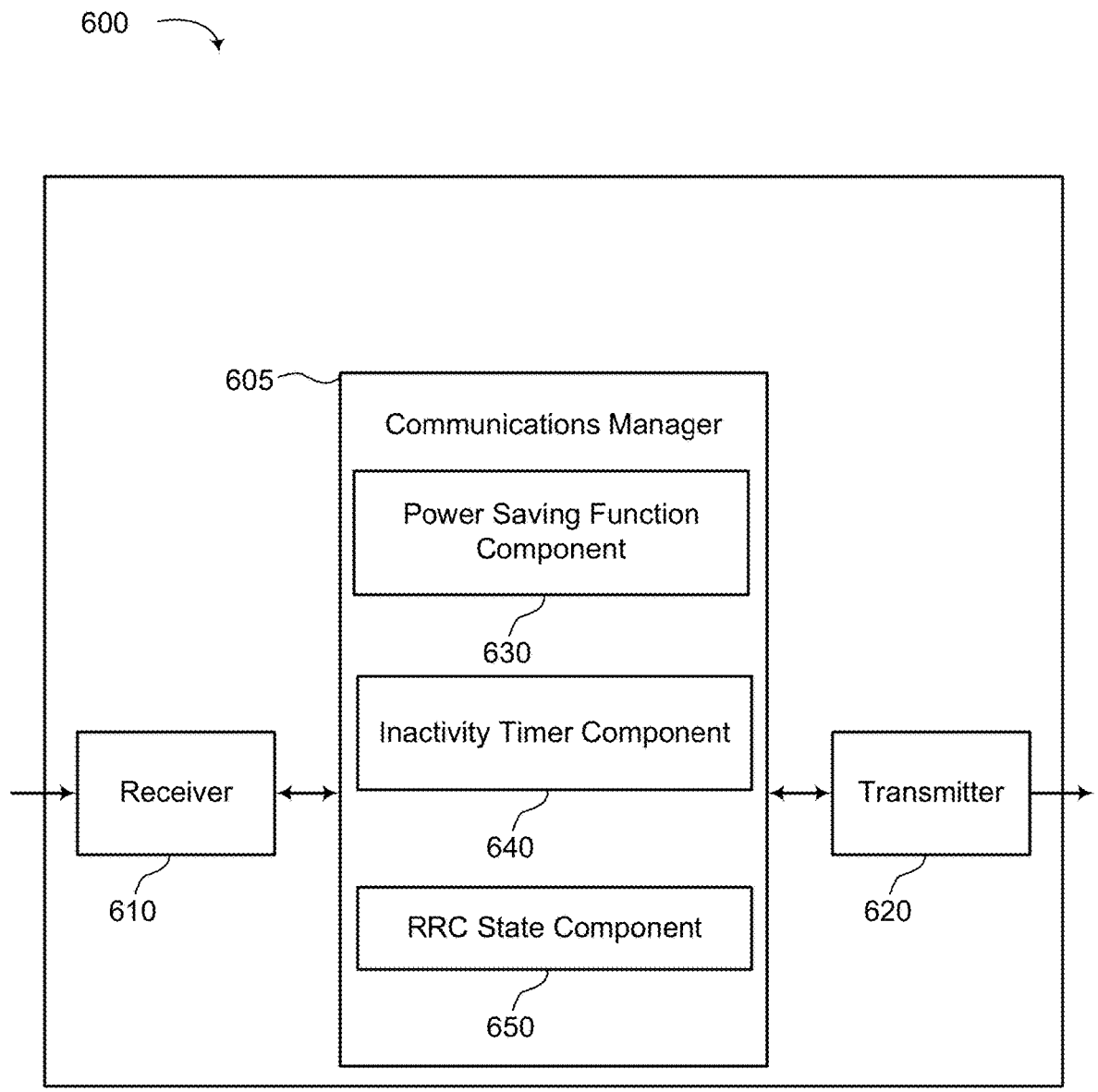
FIG. 6 is a block diagram illustrating an example wireless communication device that supports one or more power saving functions, in accordance with various aspects of the present disclosure.

FIG. 6 is a block diagram illustrating an example wireless communication device 600 that supports one or more power saving functions, in accordance with some aspects of the present disclosure. The device 600 may be an example of aspects of a UE 120 described with reference to FIGS. 1, 2, 3, 5A, and 5B. The wireless communication device 600 may include a receiver 610, a communications manager 605, a transmitter 620, a power saving function component 630, an inactivity timer component 640, and an RRC state component 650 which may be in communication with one another (for example, via one or more buses). In some examples, the wireless communication device 600 is configured to perform operations, including operations of the process 700, 800, and 900 described below with reference to FIGS. 7, 8, and 9, respectively.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel PSCCH) and data channels (for example, a physical downlink shared channel (PDSCH), physical sidelink shared channel (PSSCH), a physical uplink shared channel (PUSCH)). The other wireless communication devices may include, but are not limited to, a base station 110 as described with reference to FIGS. 1 and 2, a CU 310, DU 330, or RU 340 as described with reference to FIG. 3, or a network node 502 described with reference to FIGS. 5A and 5B.

The received information may be passed on to other components of the device 600. The receiver 610 may be an example of aspects of the receive processor 256 described with reference to FIG. 2. The receiver 610 may include a set of radio frequency (RF) chains that are coupled with or otherwise utilize a set of antennas (for example, the set of antennas may be an example of aspects of the antennas 252 described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 266 described with reference to FIG. 2. The transmitter 620 may be coupled with or otherwise utilize a set of antennas (for example, the set of antennas may be an example of aspects of the antennas 252 described with reference to FIG. 2), which may be antenna elements shared with the receiver 610. In some examples, the transmitter 620 is configured to transmit control information in a PUCCH, PSCCH, or PDCCH and data in a physical uplink shared channel (PUSCH), PSSCH, or PDSCH.

The communications manager 605 may be an example of aspects of the controller/processor 259 described with reference to FIG. 2. The communications manager 605 may include the power saving function component 630, the inactivity timer component 640, and the RRC state component 650. In some examples, working in conjunction with the receiver 610, the power saving function component 630 may receive, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. Additionally, working in conjunction with one or both of the receiver 610 or power saving function component 630, the inactivity timer component 640 may initiates a first inactivity timer of the group of inactivity timers with the respective timer duration value based on receiving a first downlink transmission from the network node or transmitting first uplink information to the network node. Furthermore, working in conjunction with the inactivity timer component 640, the RRC state component 650 may enable an RRC state of a group of RRC states based on an expiration of the first inactivity timer. The enabled RRC state may be an RRC inactive state or an RRC idle state.

In some other examples, working in conjunction with the receiver 610, the power saving function component 630 may receive a first message indicating, for each network power saving mode of a group of network power saving modes, one or more respective switching parameters for each RRC state of a group of RRC states. Additionally, working in conjunction with the receiver 610, the power saving function component 630 may receive from the network node, a second message indicating a current network power saving mode, of the group of network power saving modes, enabled at the network node. Finally, working in conjunction with the power saving function component 630, the RRC state component 650 may switch from a current RRC state, of the group of RRC states, to a new RRC state, of the group of RRC states, based on the one or more respective parameters conditions for the current RRC state associated with the current network power saving mode.

In some other examples, working in conjunction with the receiver 610, the power saving function component 630 may receive, from a network node, a first message configuring an inactivity timer including indicating a timer duration value for the inactivity timer and one of a group of timer restart values for the inactivity timer or a restart duration value for the inactivity timer. Additionally, working in conjunction with one or both of the receiver 610 or power saving function component 630, the inactivity timer component 640 may initiate the inactivity timer based on receiving a downlink transmission from the network node or transmitting uplink information to the network node. Additionally, working in conjunction with one or both of the receiver 610 or power saving function component 630, the inactivity timer component 640 may restart the inactivity timer based on receiving, from the network node, a second message indicating a current network power saving mode, of a group of network power saving modes, enabled at the network node FIG. 7 is a flow diagram illustrating an example process 700 performed by a UE 120, in accordance with some aspects of the present disclosure. The example process 700 is an example of activating one or more power saving functions to reduce power consumption. As shown in FIG. 7, the process 700 begins at block 702 by receiving, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes. At block 704, the process 700 initiates a first inactivity timer of the group of inactivity timers with the respective timer duration value based on receiving a first downlink transmission from the network node or transmitting first uplink information to the network node. As shown in FIG. 7, at block 706, the process 700 enables an RRC state of a group of RRC states based on an expiration of the first inactivity timer. The enabled RRC state may be an RRC inactive state or an RRC idle state.

Figure 8:
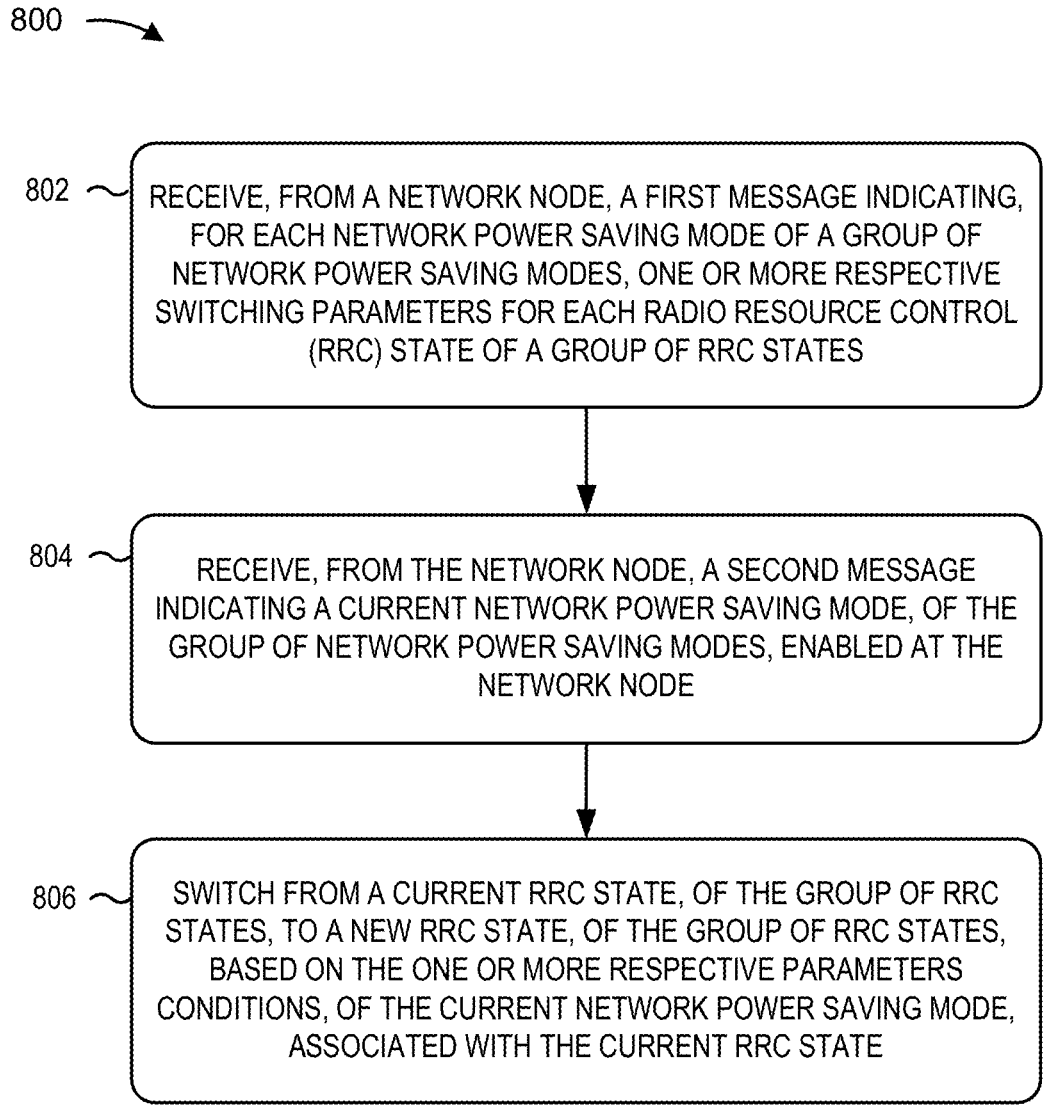
FIG. 8 is a flow diagram illustrating an example of a process performed by the UE, in accordance with various aspects of the present disclosure.

FIG. 8 is a flow diagram illustrating an example process 800 performed by a UE 120, in accordance with some aspects of the present disclosure. The example process 800 is an example of activating one or more power saving functions to reduce power consumption. As shown in FIG. 8, the process 800 begins at block 802 by receiving, from a network node, a first message indicating, for each network power saving mode of a group of network power saving modes, one or more respective switching parameters for each RRC state of a group of RRC states. At block 804, the process 804 receives, from the network node, a second message indicating a current network power saving mode, of the group of network power saving modes, enabled at the network node. At block 806, the process 800 switches from a current RRC state, of the group of RRC states, to a new RRC state, of the group of RRC states, based on the one or more respective parameters conditions, of the current network power saving mode, associated with the current RRC state.

Figure 9:
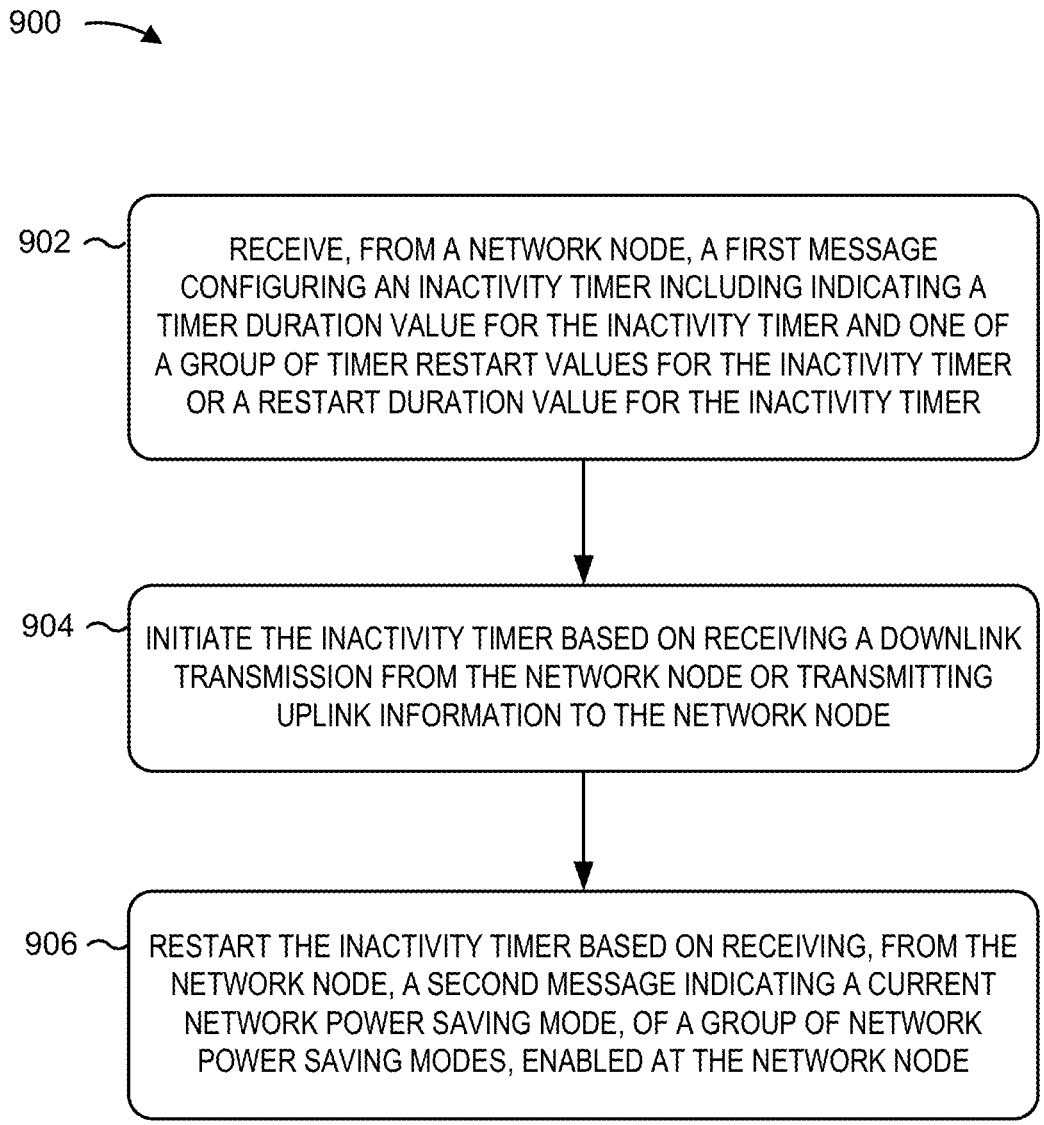
FIG. 9 is a flow diagram illustrating an example of a process performed by the UE, in accordance with various aspects of the present disclosure.

FIG. 9 is a flow diagram illustrating an example process 900 performed by a UE 120, in accordance with some aspects of the present disclosure. The example process 900 is an example of activating one or more power saving functions to reduce power consumption. As shown in FIG. 9, the process 900 begins at block 902 by receiving, from a network node, a first message configuring an inactivity timer including indicating a timer duration value for the inactivity timer and one of a group of timer restart values for the inactivity timer or a restart duration value for the inactivity timer. At block 904, the process 900 initiates the inactivity timer based on receiving a downlink transmission from the network node or transmitting uplink information to the network node. At block 906, the process 900 restarts the inactivity timer based on receiving, from the network node, a second message indicating a current network power saving mode, of a group of network power saving modes, enabled at the network node Implementation examples are described in the following numbered clauses:

Clause 1. A method for wireless communication performed by a UE, comprising: receiving, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes; initiating a first inactivity timer of the group of inactivity timers with the respective timer duration value based on receiving a first downlink transmission from the network node or transmitting first uplink information to the network node; and enabling an RRC state of a group of RRC states based on an expiration of the first inactivity timer.

Clause 2. The method of Clause 1, wherein the first message is received via an RRC message.

Clause 3. The method of Clauses 1-2, further comprising: receiving, from the network node, a second message indicating a current network power saving mode, of the group of network power saving modes, enabled at the network node; and selecting the first inactivity timer from the group of inactivity timers based on the first inactivity timer being associated with the current network power saving mode enabled by the network node.

Clause 4. The method of Clause 3, further comprising pausing each inactivity timer of the group of inactivity timers, that is not associated with the current network power saving mode, based on initiating the first inactivity timer.

Clause 5. The method of any one of Clauses 1-4, further comprising restarting the first inactivity timer based on receiving a second downlink transmission from the network node or transmitting second uplink information to the network node.

Clause 6. The method of Clause 5, further comprising transitioning from the enabled RRC state to an RRC connected state based on restating the first inactivity timer.

Clause 7. The method of Clause 6, wherein the enabled RRC state is an RRC inactive state or an RRC idle state.

Clause 8. The method of any one of Clause 5, wherein the first inactivity timer is restarted at a default restart value with the respective timer duration value.

Clause 9. A method for wireless communication performed by a UE, comprising: receiving, from a network node, a first message configuring an inactivity timer including indicating a timer duration value for the inactivity timer and one of a group of timer restart values for the inactivity timer or a restart duration value for the inactivity timer; initiating the inactivity timer based on receiving a downlink transmission from the network node or transmitting uplink information to the network node; and restarting the inactivity timer based on receiving, from the network node, a second message indicating a current network power saving mode, of a group of network power saving modes, enabled at the network node.

Clause 10. The method of Clause 9, wherein: the first message indicates the group of timer restart values; each timer restart value of the group of timer restart values is associated with a respective network power saving of the group of network power saving modes; each timer restart value of the group of timer restart values is a non-zero value; and the respective inactivity timer is restarted at the timer restart value associated with the current network power saving mode.

Clause 11. The method of Clause 10, wherein the inactivity timer is restarted with the timer duration value.

Clause 12. The method of Clause 9, wherein: the first message indicates the restart duration value; the restart duration value is a combination of the timer duration value and an offset value; and the inactivity timer is restarted at zero and with the restart duration value.

Clause 13. The method of Clause 12, wherein the offset value is a positive value.

Clause 14. The method of Clause 12, wherein the offset value is a negative value.

Clause 15. The method of any one of Clauses 9-14, wherein the first message is received via an RRC message.

Clause 16. A method for wireless communication performed at a UE, comprising: receiving, from a network node, a first message indicating, for each network power saving mode of a group of network power saving modes, one or more respective switching parameters for each RRC state of a group of RRC states; receiving, from the network node, a second message indicating a current network power saving mode, of the group of network power saving modes, enabled at the network node; and switching from a current RRC state, of the group of RRC states, to a new RRC state, of the group of RRC states, based on the one or more respective parameters conditions, of the current network power saving mode, associated with the current RRC state.

Clause 17. The method of Clause 16, wherein the one or more respective switching parameters include a first parameter indicating the new RRC state is an RRC idle state and a second parameter indicating the switching does not require expiration of an inactivity timer.

Clause 18. The method of Clause 16, wherein the one or more respective switching parameters include a first parameter indicating the new RRC state is an RRC inactive state and a second parameter indicating the switching does not require expiration of an inactivity timer.

Clause 19. The method of Clause 16, wherein the one or more respective switching parameters include a first parameter indicating a previous network power saving mode, a second parameter indicating the current network power saving mode, a third parameter indicating the new RRC state, and a fourth parameter indicating whether the switching requires expiration of an inactivity timer.

Clause 20. The method of Clause 19, wherein: the current RRC state is an RRC connected state; the previous network power saving mode is a first power saving mode; the current network power saving mode is a second power saving mode different than the first power saving mode; the new RRC state is an RRC inactive state; and the switching requires the expiration of the inactivity timer.

Clause 21. The method of Clause 19, wherein: the current RRC state is an RRC connected state; the switching requires the expiration of the inactivity timer; the new RRC state is an RRC idle state; the previous network power saving mode is a first power saving mode; and the current network power saving mode is a second power saving mode different than the first power saving mode.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
    receiving, from a network node, a first message configuring a group of inactivity timers including indicating a respective timer duration value for each inactivity timer of the group of inactivity timers, each inactivity timer of the group of inactivity timers associated with a respective network power saving mode of a group of network power saving modes;
    initiating a first inactivity timer of the group of inactivity timers with the respective timer duration value based on receiving a first downlink transmission from the network node or transmitting first uplink information to the network node; and
    enabling a radio resource control (RRC) state of a group of RRC states based on an expiration of the first inactivity timer.

2. The method of claim 1, wherein the first message is received via an RRC message.

3. The method of claim 1, further comprising:
    receiving, from the network node, a second message indicating a current network power saving mode, of the group of network power saving modes, enabled at the network node; and
    selecting the first inactivity timer from the group of inactivity timers based on the first inactivity timer being associated with the current network power saving mode enabled by the network node.

4. The method of claim 3, further comprising pausing each inactivity timer of the group of inactivity timers, that is not associated with the current network power saving mode, based on initiating the first inactivity timer.

5. The method of claim 1, further comprising restarting the first inactivity timer based on receiving a second downlink transmission from the network node or transmitting second uplink information to the network node.

6. The method of claim 5, further comprising transitioning from the enabled RRC state to an RRC connected state based on restating the first inactivity timer.

7. The method of claim 6, wherein the enabled RRC state is an RRC inactive state or an RRC idle state.

8. The method of claim 5, wherein the first inactivity timer is restarted at a default restart value with the respective timer duration value.

9. An apparatus for wireless communications at a user equipment (UE), comprising:
    a processor; and
    a memory coupled with the processor and storing instructions operable, when executed by the processor, to cause the apparatus to:
        receive, from a network node, a first message configuring a group of inactivity timers, the first message including a respective timer duration value for each inactivity timer of the group of inactivity timers;
        initiate a first inactivity timer of the group of inactivity timers with the respective timer duration value based on receiving a first downlink transmission from the network node or transmitting first uplink information to the network node; and
        enable a radio resource control (RRC) state of a group of RRC states based on an expiration of the first inactivity timer.

10. The apparatus of claim 9, wherein the first message is received via an RRC message.

11. The apparatus of claim 9, wherein execution of the instructions further cause the apparatus to:
    receive, from the network node, a second message indicating a current network power saving mode, of a group of network power saving modes, enabled at the network node; and
    select the first inactivity timer from the group of inactivity timers based on the first inactivity timer being associated with the current network power saving mode enabled by the network node.

12. The apparatus of claim 11, wherein execution of the instructions further cause the apparatus to pause each inactivity timer of the group of inactivity timers, that is not associated with the current network power saving mode, based on initiating the first inactivity timer.

13. The apparatus of claim 9, wherein execution of the instructions further cause the apparatus to restart the first inactivity timer based on receiving a second downlink transmission from the network node or transmitting second uplink information to the network node.

14. The apparatus of claim 13, wherein execution of the instructions further cause the apparatus to transition from the enabled RRC state to an RRC connected state.

15. The apparatus of claim 14, wherein the enabled RRC state is an RRC inactive state or an RRC idle state.

16. The apparatus of claim 13, wherein the first inactivity timer is restarted at a default restart value with the respective timer duration value.

17. A method for wireless communication performed by a user equipment (UE), comprising:
receiving, from a network node, a first message configuring an inactivity timer including indicating a timer duration value for the inactivity timer and one of a group of timer restart values for the inactivity timer or a restart duration value for the inactivity timer;
initiating the inactivity timer based on receiving a downlink transmission from the network node or transmitting uplink information to the network node; and
restarting the inactivity timer based on receiving, from the network node, a second message indicating a current network power saving mode, of a group of network power saving modes, enabled at the network node.

18. The method of claim 17, wherein:
the first message indicates the group of timer restart values;
each timer restart value of the group of timer restart values is associated with a respective network power saving of the group of network power saving modes;
each timer restart value of the group of timer restart values is a non-zero value; and
the inactivity timer is restarted at the respective timer restart value, of the group of timer restart values, associated with the current network power saving mode.

19. The method of claim 18, wherein the inactivity timer is restarted with the timer duration value.

20. The method of claim 17, wherein:
the first message indicates the restart duration value;
the restart duration value is a combination of the timer duration value and an offset value; and
the inactivity timer is restarted at zero and with the restart duration value.

21. The method of claim 20, wherein the offset value is a positive value.

22. The method of claim 20, wherein the offset value is a negative value.

23. The method of claim 17, wherein the first message is received via an RRC message.

24. A method for wireless communication performed at a user equipment (UE), comprising:
receiving, from a network node, a first message indicating, for each network power saving mode of a group of network power saving modes, one or more respective switching parameters for each radio resource control (RRC) state of a group of RRC states;
receiving, from the network node, a second message indicating a current network power saving mode, of the group of network power saving modes, enabled at the network node; and
switching from a current RRC state, of the group of RRC states, to a new RRC state, of the group of RRC states, based on the one or more respective parameters conditions, of the current network power saving mode, associated with the current RRC state.

25. The method of claim 24, wherein the one or more respective switching parameters include a first parameter indicating the new RRC state is an RRC idle state and a second parameter indicating the switching does not require expiration of an inactivity timer.

26. The method of claim 24, wherein the one or more respective switching parameters include a first parameter indicating the new RRC state is an RRC inactive state and a second parameter indicating the switching does not require expiration of an inactivity timer.

27. The method of claim 24, wherein the one or more respective switching parameters include a first parameter indicating a previous network power saving mode, a second parameter indicating the current network power saving mode, a third parameter indicating the new RRC state, and a fourth parameter indicating whether the switching requires expiration of an inactivity timer.

28. The method of claim 27, wherein:
the current RRC state is an RRC connected state;
the previous network power saving mode is a first power saving mode;
the current network power saving mode is a second power saving mode different than the first power saving mode;
the new RRC state is an RRC inactive state; and
the switching requires expiration of the inactivity timer.

29. The method of claim 27, wherein:
the current RRC state is an RRC connected state;
the switching requires expiration of the inactivity timer;
the new RRC state is an RRC idle state;
the previous network power saving mode is a first power saving mode; and
the current network power saving mode is a second power saving mode different than the first power saving mode.

* * * * *